United States Patent
Shi

(10) Patent No.: US 12,099,382 B1
(45) Date of Patent: Sep. 24, 2024

(54) PHOTOGRAPHIC DEVICE HOLDER CONVENIENT FOR ANGLE ADJUSTMENT AND TABLET COMPUTER REPLACEMENT

(71) Applicant: Shenzhen Siyang Smart Technology Co., Ltd., Shenzhen (CN)

(72) Inventor: Xiaomeng Shi, Shenzhen (CN)

(73) Assignee: Shenzhen Siyang Smart Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/731,538

(22) Filed: Jun. 3, 2024

(30) Foreign Application Priority Data

Jan. 25, 2024 (CN) .......................... 202420191915.4

(51) Int. Cl.
*G06F 1/16* (2006.01)
*G10L 15/22* (2006.01)

(52) U.S. Cl.
CPC .......... *G06F 1/1632* (2013.01); *G06F 1/1626* (2013.01); *G06F 1/1654* (2013.01); *G10L 15/22* (2013.01)

(58) Field of Classification Search
CPC .... G06F 1/1601; G06F 1/1626; G06F 1/1675; G03B 2215/0539
See application file for complete search history.

(56) References Cited

U.S. PATENT DOCUMENTS

| | | | |
|---|---|---|---|
| 11,500,271 B2 | 11/2022 | Liu et al. | |
| D1,026,065 S * | 5/2024 | Huang | D16/215 |
| 2007/0139515 A1 * | 6/2007 | Du Breuil | H04N 7/142 |
| | | | 348/E7.079 |
| 2015/0235532 A1 * | 8/2015 | Marszalek | G08B 13/1409 |
| | | | 340/568.3 |
| 2017/0118385 A1 * | 4/2017 | Vargas | G03B 15/03 |
| 2018/0176460 A1 * | 6/2018 | Telem | H04N 23/57 |
| 2019/0336872 A1 * | 11/2019 | Brown, Sr. | B65D 81/365 |
| 2021/0266427 A1 * | 8/2021 | Kidakarn | H04N 23/57 |
| 2022/0132046 A1 * | 4/2022 | Andres | A45C 11/00 |

* cited by examiner

*Primary Examiner* — Anthony Q Edwards

(57) ABSTRACT

The disclosure is suitable for the technical field of photo booth, and provides a photographic device holder convenient for angle adjustment and tablet computer replacement. The photographic device holder comprises a base, wherein a box body is fixedly connected at the upper end of the base, an LED light board is fixedly disposed in the box body, an acrylic panel is fixedly disposed at the front side of the box body, a first fill light support is fixedly connected at the top end of the box body, a second fill light support is movably connected at the top end of the first fill light support by a damping rotating shaft, a fixing cover plate is rotatably connected at the other end of the second fill light support, an LED fill light is fixedly connected at the front side of the fixing cover plate, a tablet computer fixing panel is fixedly disposed at the front side of the LED fill light, the tablet computer fixing panel is fixedly connected with the fixing cover plate, the upper and lower ends of the tablet computer fixing panel are respectively provided with a tablet computer pressing strip that is fixedly connected with the tablet computer fixing panel. The photographic device holder disclosed has the advantages of good compatibility, tool-free quick demounting and mounting, effectively preventing the tablet computer from shaking, supporting multi-angle shooting, and better user operation experience.

10 Claims, 6 Drawing Sheets

PHOTOGRAPHIC DEVICE HOLDER CONVENIENT FOR ANGLE ADJUSTMENT AND TABLET COMPUTER REPLACEMENT

CLAIMS OF PRIORITY

This patent application claims priority from:
(1) CN utility model patent application number is 202420191915.4 with a filing date of Jan. 25, 2024 and DAS code of 0P9F.

TECHNICAL FIELD

The present disclosure belongs to the technical field of photo booth, in particular relates to a photographic device holder convenient for angle adjusting and tablet computer replacement.

DESCRIPTION OF THE PRIOR ART

Photo booth is a self-service photo facility, and it is an intelligent photo device. Users can take self-service photos through the device, choose different photo modes and effects, and edit and process photos on the device. Photo booths are usually set up in public places, such as shopping malls, railway stations, airports and other places. Users can take self-service photos according to their own needs. The use of this kind of equipment is very convenient, users only need to select the corresponding photo mode and effect on the device, and then stand in front of the lens to take pictures.

The existing tablet computer photo booth is only suitable for some sizes of tablet computers, and the mounting and demounting process is relatively cumbersome. In addition, it is easy to shake during use, and does not support multi-angle shooting.

Therefore, in view of the above situation, it is urgent to develop a photographic device holder convenient for angle adjusting and tablet computer replacement, so as to overcome the shortcomings in the current practical use.

SUMMARY OF THE DISCLOSURE

An object of the present disclosure is to provide a photographic device holder convenient for angle adjustment and tablet computer replacement to solve the problems proposed in the backgrounds above.

In order to achieve the above purpose, the application provides the following technical solutions.

A photographic device holder convenient for angle adjustment and tablet computer replacement, comprising a base, wherein a box body is fixedly connected at an upper end of the base, an LED light board is fixedly disposed in the box body, an acrylic panel is fixedly disposed at a front side of the box body, a first fill light support is fixedly connected at a top end of the box body, a second fill light support is movably connected at a top end of the first fill light support by a damping rotating shaft, a fixing cover plate is rotatably connected at the other end of the second fill light support, an LED fill light is fixedly connected at a front side of the fixing cover plate by screws, a tablet computer fixing panel is fixedly disposed at a front side of the LED fill light, the tablet computer fixing panel is fixedly connected with the fixing cover plate by a plurality of hexagonal hand screws, an upper and a lower ends of the tablet computer fixing panel are respectively provided with a tablet computer pressing strip that is fixedly connected with the tablet computer fixing panel.

As a further technical solution, an access panel is disposed at a back side of the box body, an upper end and a lower end of one side of the access panel are respectively provided with a bolt latch with spring, and a recessed handle of access panel and a locker are also mounted on the access panel.

As a further technical solution, a lower end of the first fill light support is provided with two fixing posts, two fixing posts of the first fill light support are correspondingly mounted at holes of an upper end of the box body, and the first fill light support is fixed at the box body through a hole that is formed in the back side of the first fill light support by a screw.

As a further technical solution, two exposed holes on the back side of the first fill light support are fixedly connected with silicone plugs.

As a further technical solution, a limiting groove is disposed on a top end of the back side of the second fill light support, and a limiting post is fixedly connected on the fixing cover plate.

As a further technical solution, a rotation angle range of the fixing cover plate is 0 to 180 degrees, and a flipping angle range of the second fill light support is 0 to 315 degrees.

As a further technical solution, an upper portion of the back side of the fixing cover plate is fixedly connected with a cover plate handle.

As a further technical solution, the tablet computer fixing panel is further compatible with a variety of size specifications.

As a further technical solution, a front side of the tablet computer fixing panel is further provided with a panel knob.

In summary, compared with the prior art, the beneficial effects of the present disclosure are:
1. This device is designed to be suitable for a variety of sizes of tablet computers, increasing the compatibility of the product when used;
2. The design of the tool-free quick demounting and quick mounting for replacement and fixing of the tablet computer and the tablet computer fixing panel greatly increases the service efficiency of the product;
3. The design of fixing the tablet computer by the spring hand screws effectively prevents the tablet computer from shaking during use;
4. The combination of multiple damping rotating shafts and the positing limiting design can support multi-angle shooting such as horizontal, vertical, oblique, low angle, and overhead shooting, which increases the diversity of the device when used.
5. The use of humanized handle, knob, recessed handle pays more attention to the user's operation experience.

In order to more clearly elaborate the structural features and efficacy of the present disclosure, the present disclosure is described in detail below in conjunction with the accompanying drawings and specific embodiments.

Figure 1:
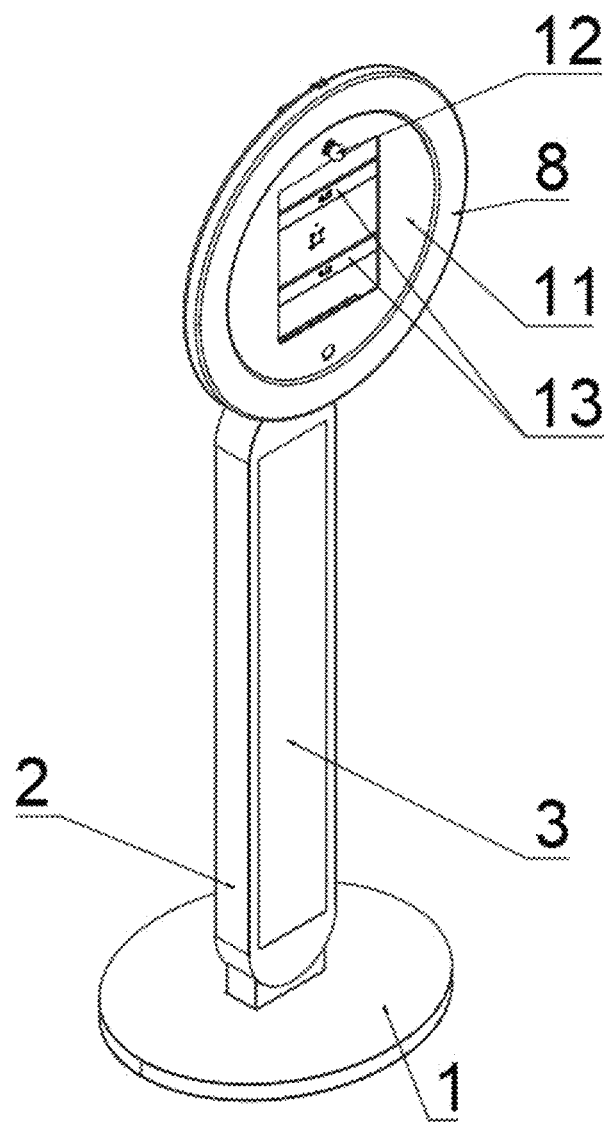
FIG. 1 is a schematic diagram of the three-dimensional structure of the device according to the present disclosure.
Figure 2:
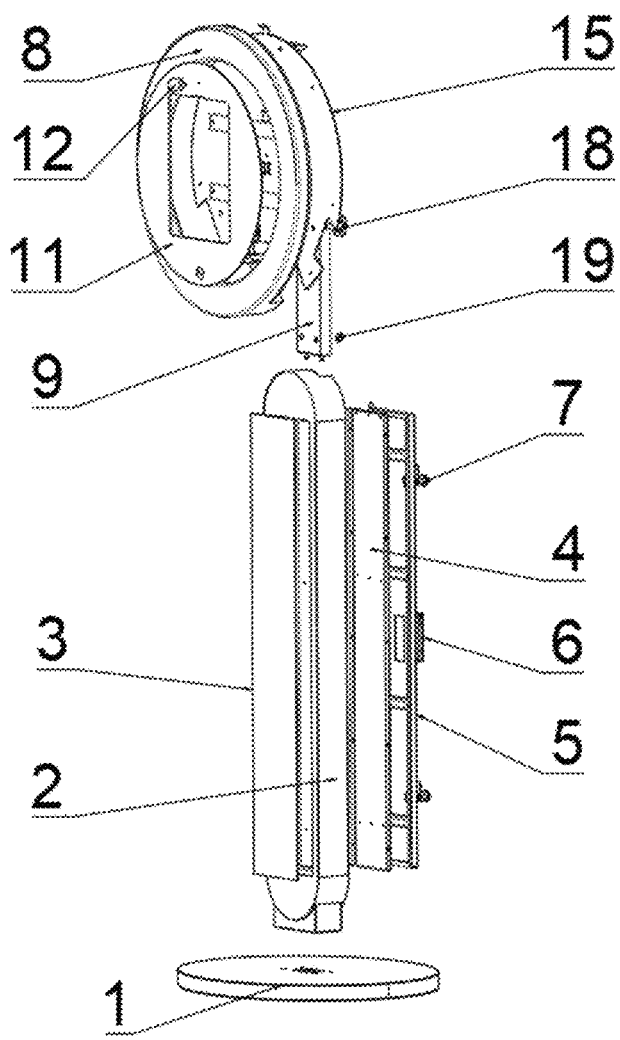
FIG. 2 is an exploded structure diagram of the device according to the present disclosure.
Figure 3:
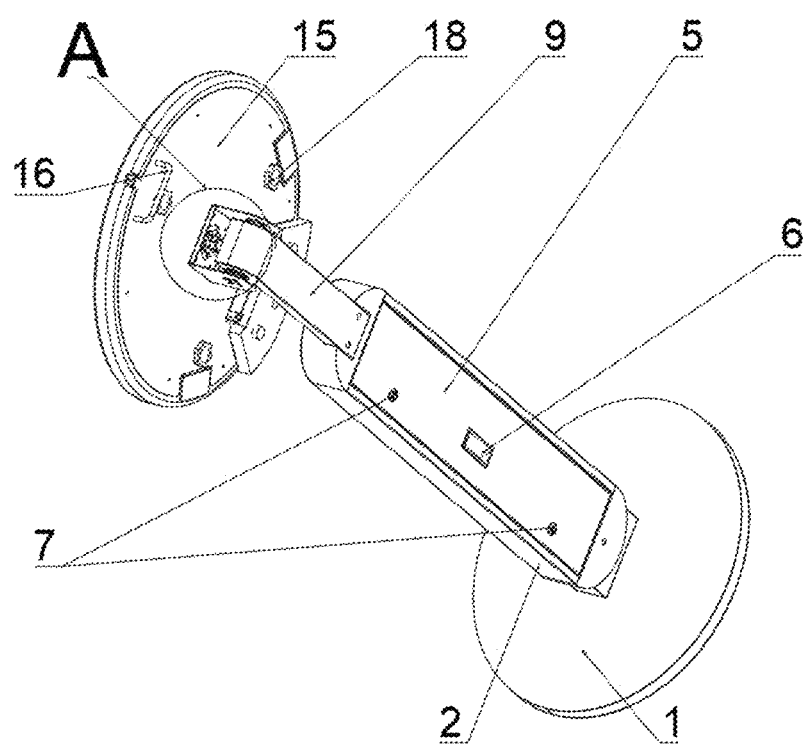
FIG. 3 is a schematic diagram of the three-dimensional structure from another perspective of the device according to the present disclosure.
Figure 4:
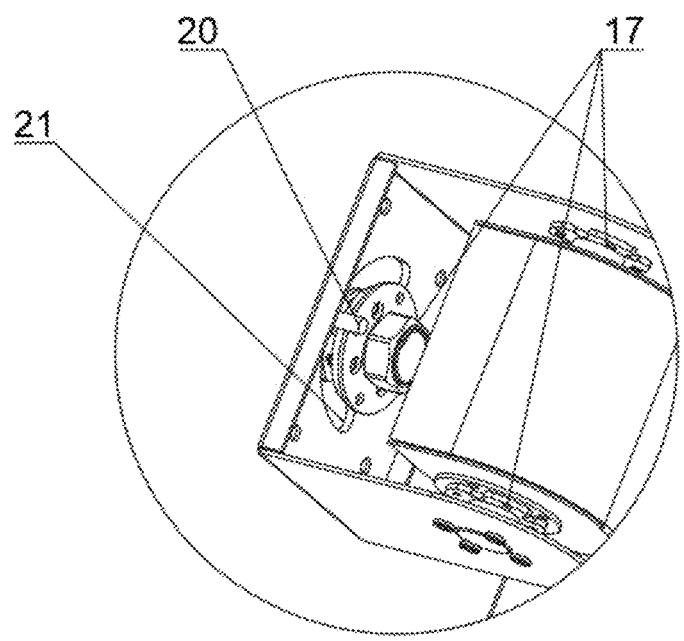
FIG. 4 is a close-up schematic diagram of the three-dimensional structure at A in FIG. 3.
Figure 5:
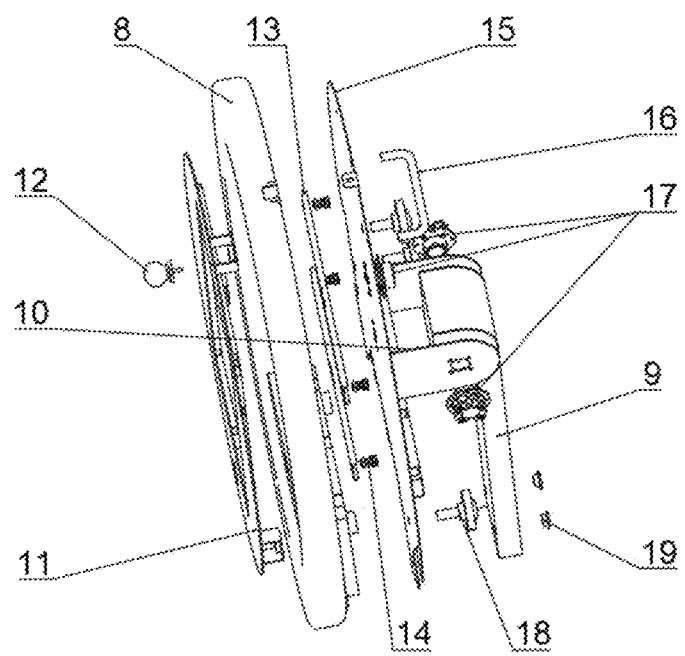
FIG. 5 is an exploded structure diagram of a part structure of the device according to the present disclosure.

In the drawings, 1 base, 2 box body, 3 acrylic panel, 4 LED light board, 5 access panel, 6 recessed handle of access panel, 7 locker, 8 LED fill light, 9 first fill light support, 10 second fill light support, 11 tablet computer fixing panel, 12 panel knob, 13 tablet computer pressing strip, 14 spring hand screw, 15 fixing cover plate, 16 cover plate handle, 17 damping rotating shaft, 18 hexagonal hand screw, 19 silicone plug, 20 limiting post, 21 limiting groove.

DESCRIPTION OF EMBODIMENTS

In order to make the object, technical solutions and advantages of the present disclosure clearer, the present disclosure is further described in detail below in conjunction with the accompanying drawings and specific embodiments. It should be understood that the specific embodiments described herein are only intended to explain the present disclosure and are not intended to limit the present disclosure.

The implementations of the present disclosure are described in detail below in conjunction with specific embodiments.

As shown in FIGS. 1 to 5, the embodiments of the present disclosure provide a photographic device holder which is convenient for angle adjustment and tablet computer replacement comprising a base 1. A box body 2 is fixedly connected at an upper end of the base 1, and an LED light board 4 used for improving the diversification of product function is fixedly disposed in the box body 2. An acrylic panel 3, which is used for anti-glare and anti-scratch, is fixedly disposed at a front side of the box body 2. A first fill light support 9 is fixedly connected at a top end of the box body 2. A second fill light support 10 is movably connected at a top end of the first fill light support 9 through a damping rotating shaft 17, and a fixing cover plate 15 is rotatably connected at the other end of the second fill light support 10.

An LED fill light 8 is fixedly connected at a front side of the fixing cover plate 15. A tablet computer fixing panel 11 is fixedly disposed at a front side of the LED fill light 8, and the tablet computer fixing panel 11 is fixedly connected with the fixing cover plate 15 by means of a plurality of hexagonal hand screws 18. An upper and a lower end of the tablet computer fixing panel 11 are respectively provided with a tablet computer pressing strip 13 that is fixedly connected with the tablet computer fixing panel 11 by means of a spring hand screw 14. The spring hand screw 14 is used for adjusting the height of tablet computer pressing strip 13, thereby applicable to match tablet computers with different thickness and making tablet computer fixed more firmly.

Further, the LED light board 4 fills the light to the character, displays the screen, plays the tutorial and pushes the advertisement.

Further, an access panel 5 is disposed at a back side of the box body 2. An upper end and a lower end of one side of the access panel 5 are respectively provided with a bolt latch with spring (not marked in the FIGS.). The bolt latch is convenient for the rotation and fixation of access panel. The access panel 5 is also provided with recessed handle 6 of access panel and lock 7. The recessed handle 6 of access panel is used for convenient opening and closing of the access panel 5, and the lock 7 is used for preventing false opening of access panel from causing safety hazard.

Further, a lower end of the first fill light support 9 is provided with two fixing posts. The two fixing posts of the first fill light support 9 are correspondingly mounted at holes of an upper end of the box body 2, and the first fill light support 9 is fixed at the box body 2 through a hole that is formed in the back side of the first fill light support by a screw.

Further, two exposed holes on the back side of the first fill light support 9 are fixedly connected with silicone plugs 19.

Further, a limiting groove 21 is disposed on a top end of the back side of the second fill light support 10, and a limiting post 20 is fixedly connected on the fixing cover plate 15. The limiting groove 21 is matched with limiting post 20 and is used for limiting the rotation angle range of the fixing cover plate 15.

Further, the rotation angle range of the fixing cover plate 15 is 0 to 180 degrees, and a flipping angle range of the second fill light support 10 is close to 360 degrees.

Further, an upper portion of the back side of the fixing cover plate 15 is fixedly connected with a cover plate handle 16 which is convenient for mounting the fixing cover plate 15 and adjusting the angle operation of it.

Further, the tablet computer fixing panel 11 is further compatible with a variety of size specifications, to be suitable for fixing and replacing tablet computers of 10.2 inches, 10.9 inches, 11 inches, 12.9 inches and other sizes, thereby increasing the compatibility of product.

Further, a front side of the tablet computer fixing panel 11 is further provided with a panel knob 12 which is used for conveniently replacing the tablet computer fixing panel 11 and prevent it from falling.

Figure 6:
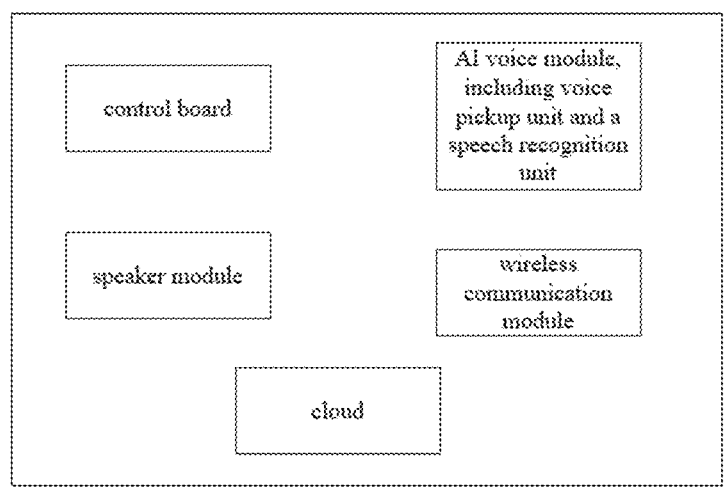
FIG. 6 is the modules of the device according to the present disclosure.

As shown in FIG. 6, the photographic device holder further comprises a control board, an AI voice module and a speaker module. The AI voice module has a voice pickup unit and a speech recognition unit, the voice pickup unit can capture language or sound, and then input and transmit to the speech recognition unit for analysis and processing to create instructions. The instructions can then be transmitted to the control board, through which the screen and LED fill light can be controlled to turn on or off, increase or decrease the brightness, change the color or switch programs, etc. The speaker module can be voiced under the action of the AI voice module and the control board. In addition, the photographic device holder further comprises a wireless communication module, which is used for connecting with a mobile terminal and connecting to a cloud where a thesaurus is stored or directly connected to a cloud, the AI voice module can transmit language or voice to the cloud after capturing it, and compare it with the thesaurus to create instructions, and then the instructions can be transmitted to the control board, through which the screen and LED fill light can be controlled to turn on or off, increase or decrease brightness, change colors, or switch programs, etc.

The foregoing are only some better embodiments of the present application and are not intended to limit the present application, and any modifications, equivalent substitutions and improvements, etc., made within the spirit and principles of this application shall be included in the scope of protection of this application.

What is claimed is:

1. A photographic device holder convenient for angle adjustment and tablet computer replacement, comprising a base, wherein a box body is fixedly connected at an upper end of the base, an LED light board is fixedly disposed in the box body, an acrylic panel is fixedly disposed at a front side of the box body, a first fill light support is fixedly connected at a top end of the box body, a second fill light support is movably connected at a top end of the first fill light support by a damping rotating shaft, a fixing cover plate is rotatably connected at the other end of the second fill light support, an LED fill light is fixedly connected at a front side of the fixing cover plate, a tablet computer fixing panel is fixedly disposed at a front side of the LED fill light, the tablet computer fixing panel is fixedly connected with the fixing cover plate, an upper and a lower ends of the tablet computer fixing panel are respectively provided with a tablet computer pressing strip that is fixedly connected with the tablet computer fixing panel.

2. The photographic device holder convenient for angle adjustment and tablet computer replacement according to claim 1, wherein an access panel is disposed at a back side of the box body, an upper end and a lower end of one side of the access panel are respectively provided with a bolt latch with spring, and a recessed handle of access panel and a locker are also mounted on the access panel.

3. The photographic device holder convenient for angle adjustment and tablet computer replacement according to claim 1, wherein a lower end of the first fill light support is provided with two fixing posts, two fixing posts of the first fill light support are correspondingly mounted at holes of an upper end of the box body, and the first fill light support is fixed at the box body through a hole that is formed in a back side of the first fill light support by a screw.

4. The photographic device holder convenient for angle adjustment and tablet computer replacement according to claim 3, wherein two exposed holes on the back side of the first fill light support are fixedly connected with silicone plugs.

5. The photographic device holder convenient for angle adjustment and tablet computer replacement according to claim 1, wherein a limiting groove is disposed on a top end of a back side of the second fill light support, and a limiting post is fixedly connected on the fixing cover plate.

6. The photographic device holder convenient for angle adjustment and tablet computer replacement according to claim 5, wherein a rotation angle range of the fixing cover plate is 0 to 180 degrees, and a flipping angle range of the second fill light support is 0 to 315 degrees.

7. The photographic device holder convenient for angle adjustment and tablet computer replacement according to claim 1, wherein an upper portion of a back side of the fixing cover plate is fixedly connected with a cover plate handle.

8. The photographic device holder convenient for angle adjustment and tablet computer replacement according to claim 1, wherein the tablet computer fixing panel is further compatible with a variety of size specifications.

9. The photographic device holder convenient for angle adjustment and tablet computer replacement according to in claim 8, wherein a front side of the tablet computer fixing panel is further provided with a panel knob.

10. The photographic device holder convenient for angle adjustment and tablet computer replacement according to in claim 1, comprising: a control board, an AI voice module, a speaker module and a wireless communication module, the AI voice module including a voice pickup unit and a speech recognition unit, wherein, the wireless communication module connecting to a cloud where a thesaurus is stored, the AI voice module transmitting language or voice to the cloud after capturing, and comparing with the thesaurus to create instructions, and then the instructions can be transmitted to the control board.

* * * * *